US006703611B2

(12) United States Patent
Glish et al.

(10) Patent No.: US 6,703,611 B2
(45) Date of Patent: Mar. 9, 2004

(54) ELECTROSPRAY IONIZATION DEVICE

(75) Inventors: Gary L. Glish, Chapel Hill, NC (US); Ryan M. Danell, Malden, MA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 14 days.

(21) Appl. No.: 10/082,664

(22) Filed: Feb. 25, 2002

(65) Prior Publication Data

US 2003/0160166 A1 Aug. 28, 2003

(51) Int. Cl.[7] .......................... B01D 59/44; H01J 49/00

(52) U.S. Cl. ........................ 250/288; 250/283; 250/281

(58) Field of Search ................................ 250/281–300, 250/423 R

(56) References Cited

U.S. PATENT DOCUMENTS

| | | | | | |
|---|---|---|---|---|---|
| 4,705,616 | A | * | 11/1987 | Andresen et al. | 250/288 |
| 5,596,192 | A | * | 1/1997 | Waki | 250/288 |
| 5,844,237 | A | * | 12/1998 | Whitehouse et al. | 250/288 |
| 5,965,883 | A | * | 10/1999 | Lee et al. | 250/288 |
| 6,107,628 | A | * | 8/2000 | Smith et al. | 250/292 |
| 6,191,418 | B1 | | 2/2001 | Hindsgaul et al. | |
| 6,486,469 | B1 | * | 11/2002 | Fischer et al. | 250/288 |
| 2002/0011562 | A1 | * | 1/2002 | Park | 250/288 |
| 2002/0027197 | A1 | * | 3/2002 | Duholke et al. | 250/288 |
| 2003/0066958 | A1 | * | 4/2003 | Okumura et al. | 250/286 |
| 2003/0071223 | A1 | * | 4/2003 | Hartley et al. | 250/288 |

OTHER PUBLICATIONS

Andrien, Bruce, Jr., "Multiple Inlet Probes for Electrospray and APCI Sources", *Proceedings of the 46th ASMS Conference on Mass Spectrometry and Allied Topics*, Orlando, FL, 1998; p. 889.

Davis, Michael et al., "A Microscale Electrospray Interface for On–Line, Capillary Liquid Chromatography/Tandem Mass Spectrometry of Complex Peptide Mixtures", *Analytical Chemistry, vol. 67, No. 24*, Dec. 15, 1995; pp. 4549–4556.

Dresch, Thomas et al., "Accurate mass measurements with a high resolution Dual–Electrospray Time–of–Flight mass spectrometer", *Proceedings of the 47th ASMS Conference on Mass Spectrometry and Allied Topics*, Dallas, Tx,1999; pp. 1865–1866.

Emmett, Mark, et al., "Micro–Electrospray Mass Spectrometry: Ultra–High–Sensitivity Analysis of Peptides and Proteins", *Journal of American Society for Mass Spectrometry, vol. 5*, 1994; pp. 605–613.

Fenn, John, "Ion Formation from Charged Droplets: Roles of Geometry, Energy, and Time", *Journal of American Society for Mass Spectrometry, vol. 4*, 1993; pp. 524–535.

(List continued on next page.)

*Primary Examiner*—John R. Lee
*Assistant Examiner*—James P. Hughes
(74) *Attorney, Agent, or Firm*—Burns, Doane, Swecker & Mathis, L.L.P.

(57) ABSTRACT

An electrospray ionization device is provided that includes one or more electrospray needles and an ion sampling device. Each needle has a distal end for receiving a sample, a tip for spraying the sample in fluid communication with the distal end, and an electrical contact for contacting at least some portion of sample therein. The ion sampling device has an entrance, an exit, and an interior in fluid communication with the entrance and the exit, and is located in proximity to the tip or tips of the one or more electrospray needles. The entrance defines an opening that has a larger area than an opening defined by the exit. The ion sampling device also has a counter-electrical contact. The electrospray ionization device further comprises means for generating an electrical potential difference between the counter-electrical contact and the electrical contact(s) of the one or more electrospray needles.

33 Claims, 10 Drawing Sheets-

OTHER PUBLICATIONS

Fong, Karen et al., "A Novel Nonmetallized Tip for Electrospray Mass Spectrometry at Nanoliter Flow Rate", *Journal of American Society for Mass Spectrometry, vol. 10*, 1999; pp. 72–75.

Gaskell, Simon, "Electrospray: Principles and Practice", *Journal of Mass Spectrometry, vol. 32*, 1997; pp. 677–688.

Gordon, Eric et al., "Hydropathic Influences on the Quantification of Equine Heart Cytochrome c Using Relative Ion Abundance Measurements by Electrospray Ionization Fourier Transform Ion Cyclotron Resonance Mass Spectrometry", *Journal of Mass Spectrometry, vol. 34*, 1999; pp. 1055–1062.

Hannis, James C., et al., "A Dual Electrospray Ionization Source Combined with Hexapole Accumulation to Achieve High Mass Accuracy of Biopolymers in Fourier Transform Ion Cyclotron Resonance Mass Spectrometry", *Journal of American Society for Mass Spectrometry*, vol. 11; pp. 876–883.

Jiang, Longfei et al., "Development of Multi–ESI–Sprayer, Multi–Atmospheric–Pressure–inlet Mass Spectrometry and Its Application to Accurate Mass Measurement Using Time–of Flight Mass Spectrometry", *Analytical Chemistry, vol. 72, No. 1*, Jan. 1, 2000; pp. 20–24.

Kim, Taeman et al., "Improved Ion Transmission from Atmospheric Pressure to High Vacuum Using a Multicapillary Inlet and Electrodynamic Ion Funnel Interface", *Analytical Chemistry, vol. 72, No. 20*, Oct. 15, 2000; pp. 5014–5019.

Kriger, M. Scott, et al., "Durable Gold–Coated Fused Silica Capillaries for Use in Electrospray Mass Spectrometry", *Analytical Chemistry, vol. 67, No. 2*, Jan. 15, 1995; pp. 385–389.

Mann, Matthias, "Electrospray: Its Potential and Limitations as an Ionization Method for Biomolecules", *Journal of Mass Spectrometry, vol. 25*, 1990; pp. 575–587.

Shaffer, Scott et al., "An Ion Funnel Interface for Improved Ion Focusing and Sensitivity Using Electrospray Ionization Mass Spectrometry", *Analytical Chemistry, vol. 70, No. 19*, Oct. 1, 1998; pp. 4111–4119.

Shaffer, Scott et al., "A Novel Ion Funnel for Focusing Ions at Elevated Pressure Using Electrospray Ionization Mass Spectrometry", *Rapid Communications in Mass Spectrometry, vol. 11*, 1997; pp. 1813–1817.

Valaskovic, Gary et al., "Attomole–Sensitivity Electrospray Source for Large–Molecule Mass Spectrometry", *Analytical Chemistry vol. 67, No. 20*, Oct. 15, 1995; pp. 3802–3805.

Wahl, Jon et al., "Attomole Level Capillary Electrophoresis–Mass Spectrometric Protein Analysis Using 5–μm–i.d. Capillaries", *Analytical Chemistry, vol. 64, No. 24*, Dec. 15, 1992; pp. 3194–3196.

Wang, Houle et al., "Zero Adjustment Device for Nanospray Mass Spectrometry", *Proceedings of the 48th ASMS Conference on Mass Spectrometry and Allied Topics*, Long Beach, CA, 2000; pp. 379–380.

Whitehouse, Craig, et al., "Electrospray Interface for Liquid Chromagraphs and Mass Spectrometers", *Analytical Chemistry, vol. 57, No. 3*, Mar. 1985; pp. 675–679.

Wilm, Matthias, et al., "Analytical Properties of the Nanoelectrospray Ion Source", *Analytical Chemistry, vol. 68, No. 1*, Jan. 1, 1996; pp. 1–8.

Wilm, Matthias, et al., "Electrospray and Taylor–Cone theory, Dole's beam of macromolecules at last", *International Journal of Mass Spectrometry and Ion Processes*, vol. 136, 1994; pp. 167–180.

Zeng, Lu, et al., "Developments of a Fully Automated Parallel HPLC/Mass Spectrometry System for the Analytical Characterization and Preparative Purification of Combinatorial Libraries", *Analytical Chemistry, vol. 70, No. 20*, Oct. 15, 1998; pp. 4380–4388.

* cited by examiner

ELECTROSPRAY IONIZATION DEVICE

This invention was made with Government support under Contract No. 5-ROI-GM49852 from the National Institutes of Health. The Government may have certain rights to this invention.

FIELD OF THE INVENTION

The present invention generally relates to devices for performing standard electrospray ionization and nanoelectrospray ionization.

BACKGROUND OF THE INVENTION

Electrospray ionization is used to transform a liquid sample into gaseous ions. A sample solution is forced or pulled through a small sprayer needle so that a fine mist of nebulized sample droplets is created. The sample is sprayed toward a counter-electrode with a high voltage applied between the solution and the counter-electrode. The high voltage causes charged molecules to be formed from the solution.

One application of electrospray ionization has been the formation of ions from an analyte sample for analysis by mass spectrometry, which can produce an analysis based on very few molecules. A sample is typically sprayed at a source orifice of a mass spectrometer with high voltage applied between the solution and the orifice to generate the ions for analysis. Because of the importance of analyzing small amounts of biological samples (particularly complex biological samples), a great deal of interest has arisen in the use of low flow rate electrospray ionization devices.

Nanoelectrospray ionization is a subset of the electrospray ionization technique that uses very low flow rates to allow the analysis of very small amounts of sample by mass spectrometry. Common volumetric flow rates for nanoelectrospray ionization are in the nL/min range. In order to achieve a stable electrospray at such low flow rates, very small sprayers must be used. Typical sprayer needles used with nanoelectrospray ionization have openings with diameters in the 1–75 $\mu$m range, whereas standard electrospray ionization sprayer needles usually have openings of 75–300 $\mu$m in diameter. Such nanoelectrospray needles are fabricated using special techniques, usually by melting and pulling a larger capillary down to a smaller opening. In order to prevent sample carryover between experiments and because the tips of the nanoelectrospray needles are very fragile, the needles are usually only used for a single sample and are then discarded.

Capturing the entire plume of ions created with standard electrospray ionization is difficult because the plume can be several centimeters in diameter and the inlet orifice (e.g., a transfer capillary) on the vacuum system of the mass spectrometer is typically less than a millimeter in diameter. Any portion of the electrospray ionization plume not captured by the transfer capillary is wasted sample. One solution to this problem is U.S. Pat. No. 6,107,628 to Smith et al., which describes an apparatus for directing ions generated at atmospheric pressures into a region under vacuum. The apparatus of the '628 patent comprises a plurality of elements contained within a region maintained at a pressure between $10^{-1}$ Millbrae and 1 bar, each of the elements having progressively larger apertures to form an "ion funnel" having an entry at the largest aperture and an exit at the smallest aperture. An RF voltage is applied to each of the elements so that the RF voltage applied to each of the elements is out of phase with the RF voltage applied to the adjacent element or elements. Although the apparatus of the '628 may achieve the goal of focusing a dispersion of charged particles, it does so by complicating the design of the electrospray ionization source.

In nanoelectrospray ionization, the small aperture size of the nanoelectrospray needles reduces the applied voltage necessary to sustain a spray, and the sprayer needle is thus positioned much closer to the sampling orifice than in electrospray. As a result of the shorter distance between the sprayer needle and orifice, and because of the smaller diameter sprayer needle, the plume from nanoelectrospray ionization is much smaller in size than the plume from standard electrospray ionization and most, if not all, of the ions created by nanoelectrospray ionization may be captured by the transfer capillary and sent to the mass spectrometer for analysis. This increase in efficiency is one of the main reasons nanoelectrospray ionization produces higher sensitivity than standard electrospray ionization. However, in order to have most or all of the ions that are created transferred into the mass spectrometer, the nanoelectrospray ionization needle must be precisely aligned with the small orifice into the mass spectrometer vacuum system. This alignment is difficult and is often only achieved using complicated and expensive cameras and microscope lenses. Additionally, because the nanoelectrospray needles are not commonly re-used (as is the case with standard electrospray ionization needles), the alignment has to be performed for every sample to be analyzed.

Researchers at Bruker Daltonics Inc. recently proposed a zero adjustment device for nanospray mass spectrometry as a solution to this problem. (See Wang et al., "Zero Adjustment Device for Nanospray Mass Spectrometry", *Proceedings of the 48$^{th}$ ASMS Conference on Mass Spectrometry and Allied Topics,* Long Beach, Calif., 2000; pp. 379–380.) The zero adjustment device is a sub-unit that can be detached from an electrospray ionization source for the sample loading, nanospray needle exchanging, and source cleaning. A pre-opened nanospray needle is self-aligned by a needle mounting union and is inserted into an ionization channel when mounted. The needle position is fixed and no fine adjustment is needed. The ionization channel is attached to a pre-capillary used as an interface between the ionization channel and the main electrospray ionization capillary. The zero adjustment nanospray device can be operated with the needle tip in a wide range of positions, which allows more tolerances on spray needle mounting. However, neither the construction of the metal ionization channel used in the zero adjustment nanospray device nor the task of interfacing the zero adjustment nanospray device with different source designs are simple tasks.

Internal calibration of a mass spectrum produces the most accurate peak assignments of an analyte solution because the calibration ions experience essentially the same conditions as the analyte ions. Typically, a calibration solution is added to the analyte solution before it is electrosprayed. However, when electrospraying two solutions containing ions of interest, ionization suppression can occur. Ionization suppression occurs when one of the species present (i.e., either the analyte or the calibrant) is more easily ionized, thereby effectively suppressing the signal of the other species contained in the sample. In addition, mixing two solutions with different solvent systems can cause problems with adduct formation, solubility, and/or reactivity.

In order to try to avoid ion suppression and other problems occurring when electrospraying mixed solutions for internal calibration of a mass spectrum, multiple sprayer standard electrospray ionization has been proposed. The analyte solution is loaded into one of the electrospray ionization needles while a calibration solution is loaded in another. The needles are either aimed at a single sampling orifice or separate orifices are used and the streams are mixed once inside the vacuum system of the mass spectrometer. The use of two or more spray needles with standard electrospray ionization sources has been demonstrated by several research groups. (See, e.g., Andrien et al., "Multiple Inlet Probes for Electrospray and APCI Sources", *Proceedings of the 46th ASMS Conference on Mass Spectrometry and Allied Topics,* Orlando, Fla., 1998; p. 889.; Dresch et al., "Accurate Mass Measurements with a High Resolution Dual-Electrospray Time-of-Flight Mass Spectrometer", *Proceedings of the 47th ASMS Conference on Mass Spectrometry and Allied Topics,* Dallas, Tex., 1999; p. 1865–1866.; Jiang et al., "Development of Multi-ESI-Sprayer, Multi-Atmospheric-Pressure-Inlet Mass Spectrometry and Its Application to Accurate Mass Measurement Using Time-of-Flight Mass Spectrometry", *Anal. Chem.* 2000, 72, 20–24; Hannis et al., "A Dual Electrospray Ionization Source Combined With Hexapole Accumulation to Achieve High Mass Accuracy of Biopolymers in Fourier Transform Ion Cyclotron Resonance Mass Spectrometry", *J. Am. Soc. Mass Spectrom.,* 2000, 11, pp. 876–883.)

Although dual sprayer standard electrospray ionization has been demonstrated, dual sprayer nanoelectrospray ionization has not been shown, probably due to the small distance between the sprayer needle and orifice. The small distance between the sprayer needle and orifice makes it difficult to position two sprayer needles such that both plumes are sampled by the source orifice but do not interfere with one another.

It would be advantageous to provide an electrospray ionization device with a simple design that has increased positional alignment tolerances and that is capable of both single and multiple nanoelectrospray ionization and standard electrospray ionization.

SUMMARY OF THE INVENTION

The present invention generally relates to electrospray ionization devices for performing standard electrospray ionization and nanoelectrospray ionization. An electrospray ionization device is provided that comprises one or more electrospray needles and a capillary. Each needle has a distal end for receiving a sample, a tip for spraying the sample in fluid communication with the distal end, and an electrical contact for contacting at least some portion of sample therein. The capillary has an inlet, an outlet, and an interior conduit in fluid communication with the inlet and the outlet, and is located in proximity to the tip or tips of the one or more electrospray needles. The inlet of the capillary has a counter-electrical contact, and at least a portion of the inlet has a larger inner diameter than any inner diameter of the interior conduit. The electrospray ionization device further comprises means for generating an electrical potential difference between the counter-electrical contact of the capillary inlet and the electrical contact(s) of the one or more electrospray needles.

In another arrangement, an electrospray ionization device is provided that comprises one or more electrospray needles and a capillary. Each needle has a distal end for receiving a sample, a tip for spraying the sample in fluid communication with the distal end, and an electrical contact for contacting at least some portion of sample therein. The capillary has an inlet, an outlet, and an interior conduit in fluid communication with the inlet and the outlet, and is located in proximity to the tip or tips of the one or more electrospray needles. The inlet of the capillary has a counter-electrical contact that comprises a high transmission metal mesh covering the inlet. The electrospray ionization device further includes means for generating an electrical potential difference between the counter-electrical contact of the capillary inlet and the electrical contact(s) of the one or more electrospray needles.

In yet another arrangement, an electrospray ionization device is provided that comprises one or more electrospray needles and a capillary. Each needle has a distal end for receiving a sample, a tip for spraying the sample in fluid communication with the distal end, and an electrical contact for contacting at least some portion of sample therein. The capillary has an inlet, an outlet, and an interior conduit in fluid communication with the inlet and the outlet, and is located in proximity to the tip or tips of the one or more electrospray needles. The inlet of the capillary is shaped to aerodynamically focus ions generated from the one or more electrospray needles into the interior conduit of the capillary, and at least a portion of the inlet has a larger inner diameter than any inner diameter of the interior conduit. The inlet also has a counter-electrical contact. The electrospray ionization device further comprises means for generating an electrical potential difference between the counter-electrical contact of the capillary inlet and the electrical contact(s) of the one or more electrospray needles. The capillary and the one or more electrospray needles are arranged such that, under electrospray conditions, at least a portion of ions generated from each of the one or more electrospray needles will enter the inlet of the capillary.

In a further arrangement, a nanoelectrospray ionization device is provided that comprises one or more nanoelectrospray needles and a capillary. Each of the one or more needles has a distal end for receiving a sample, a tip for spraying the sample in fluid communication with the distal end, and an electrical contact for contacting at least some portion of sample therein. The capillary has an inlet, an outlet, and an interior conduit in fluid communication with the inlet and the outlet, and is located in proximity to the tip or tips of the one or more nanoelectrospray needles. The inlet is shaped to aerodynamically focus ions generated from the one or more nanoelectrospray needles into the interior conduit of the capillary. At least a portion of the inlet has a larger inner diameter than any inner diameter of the interior conduit. The inlet also has a counter-electrical contact comprising a high transmission metal mesh covering the inlet of the capillary. The nanoelectrospray ionization device further comprises means for generating an electrical potential difference between the counter-electrical contact of the capillary inlet and the electrical contact(s) of the one or more nanoelectrospray needles.

In yet a further arrangement, an electrospray ionization device is provided that comprises one or more electrospray needles and an ion sampling device. Each needle has a distal end for receiving a sample, a tip for spraying the sample in fluid communication with the distal end, and an electrical contact for contacting at least some portion of sample therein. The ion sampling device has an entrance, an exit, and an interior in fluid communication with the entrance and the exit, and is located in proximity to the tip or tips of the one or more electrospray needles. The entrance defines an opening that has a larger area than an opening defined by the exit. The ion sampling device also has a counter-electrical contact. The electrospray ionization device further comprises means for generating an electrical potential difference between the counter-electrical contact and the electrical contact(s) of the one or more electrospray needles.

In another arrangement, an electrospray ionization device is provided that comprises one or more electrospray needles and means for sampling ions generated during electrospray ionization. Each of the one or more needles have a distal end for receiving a sample, a tip for spraying the sample in fluid communication with the distal end, and an electrical contact for contacting at least some portion of sample therein. The means for sampling ions is shaped to aerodynamically focus ions generated from the one or more electrospray needles and includes a counter-electrical contact. The electrospray ionization device further comprises means for generating an electrical potential difference between the counter-electrical contact and the electrical contact(s) of the one or more electrospray needles. The means for sampling ions and the one or more electrospray needles are arranged such that, under electrospray conditions, at least a portion of ions generated from each of the one or more electrospray needles will be sampled by the means for sampling ions.

DETAILED DESCRIPTION OF THE INVENTION

Figure 1:
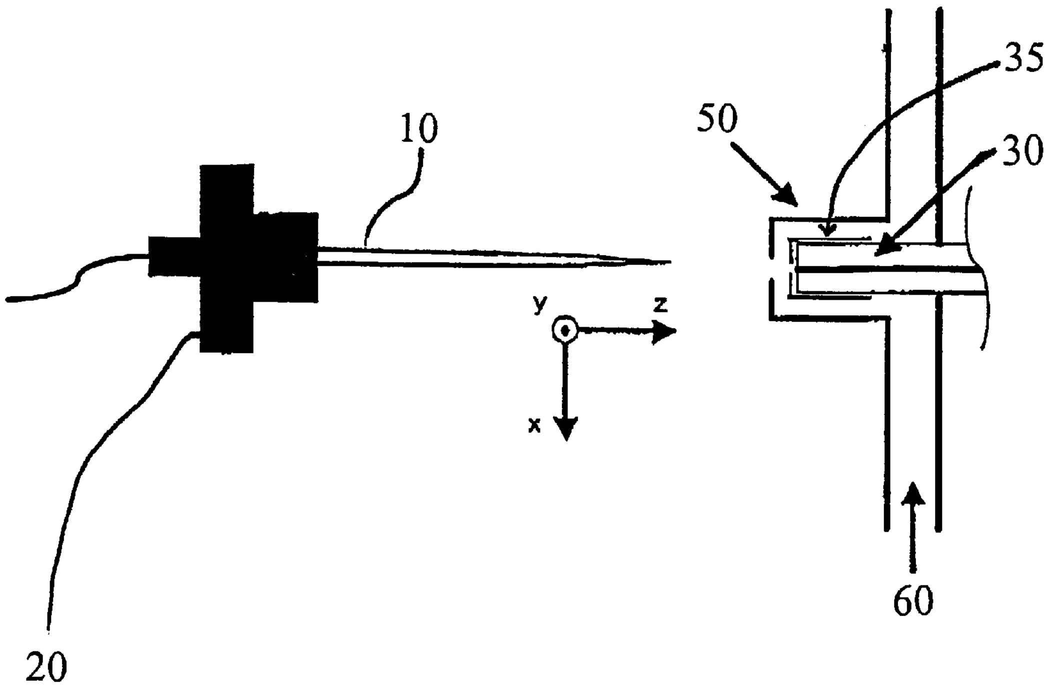
FIG. 1 illustrates the general arrangement of an electrospray ionization device.

The present invention generally relates to an improved electrospray ionization device that is capable of standard electrospray ionization and nanoelectrospray ionization. The electrospray ionization device comprises one or more electrospray ionization needles and an ion sampling device (such as, for example, a capillary having an inlet and an outlet). Each of the one or more electrospray needles has an electrical contact while the ion sampling device has a counter-electrical contact. The electrospray ionization device may further include means for generating an electrical potential difference between the electrical contact of each of the one or more needles and the counter-electrical contact. As further explained below, the potential difference is used to ionize the sample or samples in the one or more electrospray needles.

The devices described herein provide advantages over known electrospray ionization devices. The devices provide zero adjustment electrospray ionization (including nanoelectrospray ionization) and have increased durability as compared to known electrospray ionization devices. In addition, the devices may allow the simultaneous introduction of ions created from multiple liquid samples into a mass spectrometer using both standard electrospray ionization and nanoelectrospray ionization. The devices require minimal optimization to obtain high quality mass spectra of multiple liquid samples sprayed simultaneously. Furthermore, by allowing separate solutions to be simultaneously introduced as ions into a mass spectrometer, the devices reduce or eliminate the problems associated with interaction between the components of two different solutions such as adduct formation, ionization suppression, and chemical reactivity. This design allows existing electrospray ionization devices to be modified to provide an electrospray ionization device in accordance with the present invention, although new electrospray ionization devices in accordance with the present invention could also be separately constructed.

Definitions:

Unless otherwise stated, the following terms used in the specification and claims have the meanings given below:

"Electrospray ionization" means the general technique of transforming a solution into ions in the gas phase using an electrospray ionization needle and an electrical potential difference.

"Nanoelectrospray ionization" means the process of electrospray ionization at flow rates on the order of nanoliters per minute.

"Standard electrospray ionization" means the process of electrospray ionization at flow rates above the flow rates for nanoelectrospray ionization.

The sprayer needles may be standard electrospray or nanoelectrospray needles and may be formed from glass, metal (such as stainless steel), fused silica, or other suitable material or combination of materials. Each needle has a distal end for receiving a sample and a tip for spraying the sample in fluid communication with the distal end. Each of the needles also has an electrical contact for contacting at least some portion of a sample solution contained within the needle. The electrical contact may be any electrically conductive material that is positioned to contact a sample solution contained in the needle. The electrical contact is preferably positioned to contact a sample solution in the tip of the needle. For example, the electrical contact may be a metal coating on the tip of the needle (i.e., a metalized tip) or may be a wire that is positioned so that it will contact sample solution contained in the tip of the sprayer needle. In a preferred embodiment, the electrical contact comprises an inert, small-diameter wire that is inserted from the distal end of the needle and is positioned so that it will contact sample solution located in the tip of the needle. Using a wire as the electrical contact is advantageous over a metalized tip because of the ease of fabrication as well as the greater durability of the wire.

Commercially available needles may be used or the needles may be fabricated, for example, from glass capillaries. An example of fabrication of nanoelectrospray needles from glass capillaries is detailed in the Examples below.

Standard electrospray needles typically have a tip inner diameter from about 75 μm to about 300 μm, preferably from about 100 μm to about 150 μm. Nanoelectrospray needles typically have a tip inner diameter from about 1 μm to about 75 μm, preferably from about 3 μm to about 20 μm. It is noted, however, that larger or smaller needles may be used for both standard electrospray ionization and nanoelectrospray ionization so long as the desired flow rate is produced (i.e., flow rates on the order of nanoliters per minute for nanoelectrospray ionization and higher flow rates for standard electrospray ionization).

The ion sampling device acts as means for sampling ions generated during electrospray ionization and has an entrance, an exit, and an interior in fluid communication with the entrance and the exit. The ion sampling device is preferably shaped to aerodynamically focus ions generated from the one or more electrospray needles through the exit. Both the entrance and the exit of the ion sampling device define an opening; the opening defined by the entrance preferably has a larger area than the opening defined by the exit. The ion sampling device may be formed from glass, metal (such as stainless steel), fused silica, or other suitable material or combination of materials. The ion sampling device (i.e., the means for sampling ions) may comprise, for example, a capillary as described below or may comprise a funnel-shaped or cone-shaped structure. When the ion sampling device comprises a funnel-shaped or cone-shaped structure, the entrance of the ion sampling device defines an opening with a larger area than the opening defined by the exit.

Figures 2A, 2B, 2C:
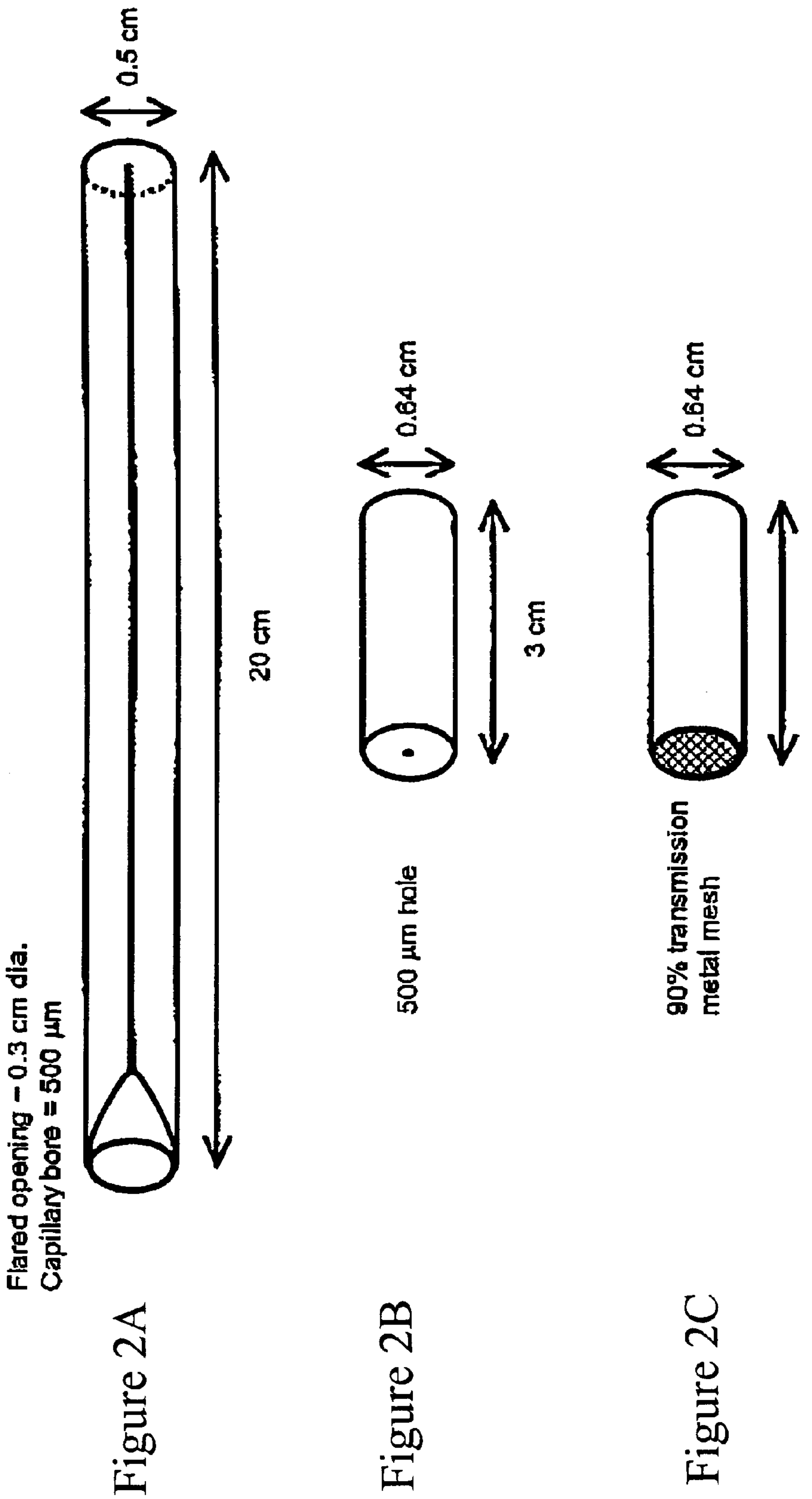
FIG. 2A illustrates one embodiment of a capillary in accordance with the present invention.
FIG. 2B illustrates a metal end cap for use with the capillary of FIG. 2A.
FIG. 2C illustrates a mesh end cap for use with the capillary of FIG. 2A.

The ion sampling device may comprise a capillary having an inlet, an outlet, and an interior conduit in fluid communication with the inlet and the outlet. The inlet of the capillary forms the entrance of the ion sampling device and the outlet of the capillary forms the exit of the ion sampling device. The capillary may be formed from glass, metal (such as stainless steel), fused silica, or other suitable material or combination of materials. At least a portion of the inlet has a larger inner diameter (or a larger inner cross-sectional area in a plane perpendicular to the general axis defined by the longitudinal length of the capillary between the inlet and the outlet) than any inner diameter (or inner cross-sectional area) of the interior conduit of the capillary. The inlet of the capillary is preferably shaped to aerodynamically focus ions generated from the one or more electrospray needles into the interior of the capillary. For example, the inlet of the capillary could be funnel-shaped or cone-shaped. One embodiment of a capillary in accordance with the present invention is illustrated in FIG. 2A, which is described more fully in connection with the Examples below.

The ion sampling device (e.g., the capillary) is located in proximity to, and preferably is generally in front of, the tip(s) of the one or more needles such that the spray from the one or more needles is directed towards the entrance of the ion sampling device (e.g., the inlet of the capillary). The ion sampling device (e.g., the capillary) and the one or more electrospray needles should be arranged such that, under electrospray conditions, at least a portion of the ions generated from each of the one or more electrospray needles will enter the entrance of the ion sampling device (e.g., the inlet of the capillary). The one or more electrospray needles may be positioned within the entrance of the ion sampling device (e.g., the inlet of the capillary) or may be positioned a distance away from the entrance (i.e., in the z direction as shown in FIG. 1). Exact radial alignment (i.e., in the x or y directions as shown in FIG. 1) of the ion sampling device (e.g., the capillary) and the one or more electrospray needles is not necessary in the present invention. This is because the entrance of the ion sampling device (e.g., the inlet of the capillary) provides a relatively large effective sampling orifice that allows some positional tolerance in aligning the one or more electrospray needles with the entrance. The positional tolerances of one embodiment of the present invention is described in the Examples below.

The overall size of the ion sampling device and the size of the entrance and exit of the ion sampling device are all dictated by the particular application in which the electrospray ionization device is being used. Therefore, when using a capillary as the ion sampling device, the overall size of the capillary and the size of the inlet, outlet, and interior conduit of the capillary are all dictated by the particular application in which the electrospray ionization device is being used. A capillary is typically used as a transfer capillary to transfer ions of one or more samples into a mass spectrometer (typically to a first vacuum chamber of the mass spectrometer); however, a capillary or other ion sampling device could be used to transfer ions of one or more samples for other uses such as, for example, ion mobility spectrometry. Any type of mass spectrometer may be used that is compatible with the electrospray ionization device of the present invention. The liquid sample or samples may be supplied to the one or more sprayer needles in various ways from various sources. For example, the sample could be supplied directly from liquid chromatography (LC), high performance liquid chromatography (HPLC), supercritical fluid chromatography (SFC), or from capillary electrophoresis (CE), or could be supplied by a syringe or by a pump and a supply line. Because the liquid samples may be supplied from a variety of sources, the present invention may be used in techniques such as LC-MS, HPLC-MS, SFC-MS, and CE-MS.

The ion sampling device also includes a counter-electrical contact. The counter-electrical contact may be positioned at any position that will allow electrospray ionization to occur and that will help direct ions into the entrance of the ion sampling device. When the ion sampling device comprises a capillary, the counter-electrical contact may be positioned at, on, or near the inlet of the capillary, or at any other position that will allow electrospray ionization to occur and that will help direct ions into the inlet of the capillary. The counter-electrical contact may comprise any electrically-conductive material that is capable of sustaining the electrical potential difference that causes electrospray ionization and may be present in any shape that allows ions to pass through the ion sampling device into the entrance and out of the exit. For example, the counter-electrical contact may comprise a metal coating on the ion sampling device or a metal mesh positioned at, on, or near the entrance of the ion sampling device. When using a capillary as the ion sampling device, the counter-electrical contact may comprise a metal coating on the capillary inlet or may comprise a metal mesh positioned at, on, or near the inlet of the capillary. One preferred embodiment of a counter-electrical contact for use with a capillary comprises a high transmission metal mesh cap (e.g., at least 90% transmission) designed to fit over the inlet of the capillary tube; such a mesh cap is illustrated in FIG. 2C and is described in the Examples below.

It should be noted that when the ion sampling is formed from metal (e.g., stainless steel) or other electrically-conductive material, the ion sampling device itself may be the counter-electrical contact. For example, where a capillary is formed from stainless steel or other electrically conductive material, the capillary itself may be the counter-electrical contact. Also, when a portion of the ion sampling device is formed from an electrically conductive material, that portion may serve as the counter-electrical contact. For example, in an electrospray ionization device having a capillary with a metal inlet, the metal inlet may be the counter-electrical contact.

The electrospray ionization device may also include means for generating an electrical potential difference between the electrical contact(s) of the one or more electrospray ionization needles and the counter-electrical contact. Such means may include any power source capable of generating a sufficient voltage necessary for the particular electrospray application. The electrical potential difference used for standard electrospray ionization is typically from about 3000 V to about 5000 V while the electrical potential difference used for nanoelectrospray ionization is typically from about 500 V to about 1200 V; however, higher or lower electrical potential differences may be used in both standard electrospray ionization and nanoelectrospray ionization. The electrical potential difference may be created by applying voltage to one or both of the electrical contact(s) and the counter-electrical contact. For example, a positive voltage could be applied to the electrical contact(s) of the one or more needles with a lower voltage (or a negative voltage) applied to the counter-electrical contact. The counter-electrical contact may also be held at ground potential when a positive voltage is applied to the electrical contact(s) of the one or more needles. Alternately (and as further explained in the Examples below), a negative voltage could be applied to the counter-electrode while the electrical contact(s) of the one or more needles are held at ground potential. Furthermore, the voltages above may also be reversed for use with electrospraying negative ions.

The electrospray ionization device may also include other known equipment. For example, a pump may be provided to force the sample through the sprayer needle. As further explained in the Examples below, however, nanoelectrospray ionization typically does not require a pump as the electrical potential difference may initiate and sustain sample flow. With reference to FIG. 1, the electrospray ionization device may include one or more sprayer needles 10 mounted on a translation stage 20 and used with a countercurrent drying gas 60 and gas enclosure 50, as described further in the Examples below. In addition, the electrospray ionization device may be housed in a spray chamber if desired.

The electrospray ionization device may be used with a single sprayer needle or with multiple sprayer needles in standard electrospray ionization and nanoelectrospray ionization. Simultaneous multiple nanoelectrospray ionization is enabled by the relatively large sampling area provided by the entrance of the ion sampling device (e.g., the capillary inlet). That is, the entrance of the ion sampling device (e.g., the capillary inlet) allows the multiple nanoelectrospray ionization needles to be positioned such that the plumes of each of the multiple nanoelectrospray needles are sampled by the ion sampling device (e.g., the capillary) without substantial interference occurring between the samples in the multiple needles. However, it would also be possible to purposely allow samples to interact during the multiple electrospray ionization should that effect be desired. A rigid mount with fixed positioning for the sprayer needles could be constructed with the positions optimized for multiple nanoelectrospray ionization, thus eliminating any optimization to eliminate unwanted interactions between separate solutions.

One specific use of a multiple electrospray ionization device is for improved internal mass calibration in mass spectrometry. Internal calibration of a mass spectrum will produce the most accurate peak assignments because the calibration ions will experience essentially the same conditions as the analyte ions of interest. An example of a multiple sprayer nanoelectrospray ionization device according to the present invention is described in the Examples below.

Another use of a multiple electrospray ionization device would be to use the device to increase the efficiency of testing sequential samples. For example, samples to be tested individually could be supplied to different needles in a multiple electrospray ionization device according to the present invention. Because the plume created from each of the sprayer needles will be sampled by the entrance of the ion sampling device such as the inlet of a capillary (as a result of the increased radial positioning tolerance due to the relatively large sampling area of the entrance of the ion sampling device), each sample may be tested without adjustment of the electrospray ionization device. Because known nanoelectrospray ionization devices require precise alignment with a capillary inlet (or the entrance of another ion sampling device) and because nanoelectrospray ionization needles are typically replaced after each test, much time must be expended between the testing of each individual solution. Using a multiple nanoelectrospray ionization device according to the present invention to sequentially test individual solutions supplied to different needles would result in increased efficiency as compared to known methods of sequentially testing individual solutions. Furthermore, the efficiency of such individual testing (or the efficiency of multiple electrospray ionization) could be increased even further by providing mounting stages holding multiple needles that are easily interchangeable in a multiple electrospray ionization device of the present invention.

EXAMPLES

The invention will be further explained by the following illustrative examples that are intended to be non-limiting.

I. Experimental Samples, Equipment, and Procedure

A. General Arrangement of Equipment

The general arrangement of the equipment that was used in the Examples below is illustrated in FIG. 1. As shown in FIG. 1, a nanoelectrospray ionization needle 10 was mounted on a translation stage 20. Although only one nanoelectrospray ionization needle 10 is shown in FIG. 1, two needles 10 were used in Example 4 below. The nanoelectrospray ionization needle 10 was positioned such that a transfer capillary 30 with an end cap 35 was generally in front of the needle 10. The transfer capillary was used to transfer ions created by the nanoelectrospray device to a first vacuum chamber of a mass spectrometer.

A countercurrent drying gas enclosure 50 was included around the capillary 30. The enclosure 50 was used to contain a flow of countercurrent drying gas 60 used to aid in the desolvation of charged droplets and to isolate the electrospray plume from other air currents within the laboratory area. The enclosure 50 was important in containing the drying gas around the spray plume and in isolating the electrospray plume.

It is noted that the particular design of the capillary, end cap, and other equipment used in the arrangement was varied as discussed in the Examples below.

B. Samples

Cyclic decapeptide Gramicidin S and polypropylene glycol with an average molecular weight of 425 amu (referred to herein as PPG 425) were obtained from Sigma Chemical Company (St. Louis, Mo.) to prepare the liquid samples used in the following Examples. Solutions of Gramicidin S resulting in final concentrations between 2–35 μM were prepared in a 75:20:5 mixture of methanol:water:acetic acid (glacial) such that excess protons were available to act as the charge carrier. Solutions of PPG 425 having a concentration of 50 μM were prepared in methanol. Sodium acetate was added to the PPG 425 solutions to promote sodium cationization of the polymer. The final $Na^+$ concentration in the PPG 425 solutions was 50 μM.

C. Nanoelectrospray Ionization Needles

The nanoelectrospray ionization needles used in the following Examples were constructed by pulling a capillary tube into two separate sprayer needles with very fine tips using a mechanical, heated capillary puller. The sprayer needles were created using glass capillaries obtained from Drummond Scientific Company (Broomall, Pa.) having an outer diameter of 0.169 cm and an inner diameter of 0.135 cm. A Narishige (Narishige International USA, Inc., East Meadow, N.Y.) model PP-830 dual stage glass microelectrode puller (gravity assisted) was used in a two-step pulling mode to create fine tipped sprayer needles. According to the two-step mode of the dual stage glass microelectrode puller, a high temperature was first used to pull the center of one of the long capillary tubes down to a smaller interior diameter, and then a lower temperature was used to pull the capillary into two separate pieces. The tips of the needles were pre-opened after pulling the capillary tube into two separate pieces; no additional procedure was necessary to open the tips further. Tip inner diameters in the range of 2 to 8 μm were easily obtained by varying the temperature of the second pulling step; lower temperatures produced larger needle tips. The tip inner diameters were reproducible to within 0.5 gm. Needles with 5 μm tip diameters were used in the Examples below.

Sample solutions were loaded into the sprayer needles using a syringe inserted in the back of the needle down to the start of the taper of the tip. Approximately 10 μL of sample was loaded into the tapered tip of a needle for each analysis. An air bubble was usually left in the solution volume and/or at the tip of the needle after loading. Larger bubbles were eliminated by tapping lightly on the side of the needle. However, to ensure that the fine tip was properly loaded, a light pressure of compressed air was applied to the back of the capillary to force a small amount of solution out of the tip, producing a barely visible fine spray and effectively priming the needle for operation. No further forced flow was used when the sprayer was mounted and used for nanoelectrospray ionization. The force created by the electric potential drop as well as the air flow into the source was enough to support a stable flow of analyte solution.

D. Translation Stage and Needle Holder

Figure 3:
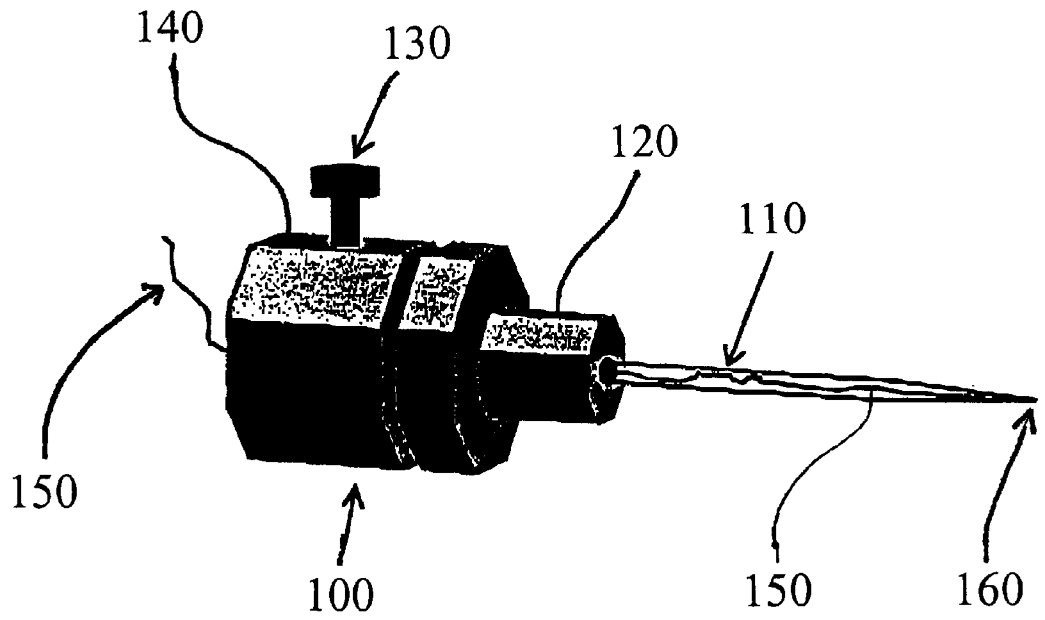
FIG. 3 is a schematic diagram of an electrospray ionization needle holder in accordance with the present invention.

Loaded sprayer needles were mounted on an x-y-z translation stage in-line with the front of the capillary. As shown in FIG. 3, a modified Swagelok ¼" to 1/16" stainless steel reducing union 100 was used to hold the needles 110 in place. The Swagelok reducing union 100 was modified by (1) enlarging the 1/16" end 120 so that it could accommodate the outer diameter of the needle 110, (2) replacing the metal ferrules with enlarged 1/16" nylon ferrules so that the needles 110 would not be crushed when the fitting was tightened, and (3) adding a securing screw 130 to the ¼" side 140 of the union.

The securing screw was used to secure a small-diameter wire 150 (e.g., a syringe cleaning wire) that was inserted into the large end of the sprayer needle so that it would contact the solution contained in the tapered tip 160. This wire provided the electrical contact necessary to complete the nanoelectrospray ionization "circuit" with the counter-electrical contact of the capillary inlet (e.g., the single hole or mesh metal cap described below).

E. Mass Spectrometer Instrumentation

The mass spectrometer used for all Examples below was a Bruker (Billerica, Mass.) Esquire ion trap. Except as noted below, all instrument operating parameters were held constant when comparing the operation of different nanoelectrospray ionization device configurations. In general, the instrument was set to accumulate ions from the ion source for 1 to 5 msec and then record a mass spectrum of these trapped ions. All of the data shown in the Figures represent the average of approximately 40 individual mass spectra acquired under identical conditions.

F. Initiation and Optimizing Ionization

The following procedure was used in the Examples below to initiate nanoelectrospray ionization and, if necessary, to optimize the nanoelectrospray ionization.

First, the nanoelectrospray ionization needle was positioned approximately 3 mm away from the inlet of the transfer capillary. This position was just inside of the countercurrent drying gas enclosure. After positioning the needle (or needles), the countercurrent drying gas flow was started at an initial flow rate of approximately 10 L/hr. (In comparison, standard electrospray ionization usually uses a drying gas flow rate of 200–300 L/hr.) Nitrogen ($N_2$) was used as the drying gas for all experiments. The acquisition of data by the instrument was then started and a potential of −1100 V was applied to the counter-electrical contact of the capillary while the entire sprayer needle holder (and therefore the sample solution) was held at ground potential. In most cases, mass spectral signal was observed immediately.

However, signal was not observed in some cases, presumably because the positioning, voltage, and/or nitrogen flow was not optimum. In order to obtain signal in those cases, the sprayer needle was moved closer to the entrance of the capillary, which increased the field gradient between the needle tip and the capillary, therefore increasing the force for sample flow and ionization. Once signal was obtained from the instrument, the spray voltage and $N_2$ flow was optimized to produce the most intense signal possible. In the large majority of cases, only the $N_2$ countercurrent gas flow needed optimization; however, the spray voltage occasionally needed to be decreased by 100–200 V (i.e., to a more negative value).

The gas flow was optimized by lowering the flow rate until the signal levels peaked and then began to decrease. At this setting, the $N_2$ flow was slowly increased until the optimum signal was regained. The optimal countercurrent flow rates used were in the range of 1–20 L/hr and were dependent on the sample, the solvent system, and the specific positioning of the sprayer needle.

G. Flow Rate

The flow rate of sample from the nanoelectrospray ionization needles in the Examples described below was determined by the size of the sprayer tip, the spray voltage, and the suction generated by the air flow down the transfer capillary into the instrument (i.e., air flow into the first vacuum chamber of the mass spectrometer). The most difficult of these parameters to control was the size of the sprayer tip. Although the pulling process described above was quite reproducible, other factors contributed to the tip size. These factors included the age of the needle (e.g., if sprayer needles were prepared in advance of analysis) and overall handling of the sprayer needle.

Furthermore, flow rates were occasionally affected by the presence of particulates in the sample. No effort was made to filter the samples, and occasionally small particles would partially or completely block the solution flow out of the tip. Flow rates were typically determined by loading a known amount of solution into a nanoelectrospray ionization needle and acquiring signal until the sample was completely exhausted. Flow rates in the range of 15–750 nL/min were observed but were only roughly controllable by the capillary puller settings due to the factors mentioned above. All flow rates that were observed produced sustained signal from less than 5 μL of sample such that complete mass spectral characterization was possible.

II. Example 1

Comparison of Nanoelectrospray Ionization Device According to the Present Invention to Known Device In order to assess the performance of the nanoelectrospray ionization source according to the present invention, the signal obtained therefrom should be compared to a signal obtained with a standard electrospray ionization device. This comparison was accomplished in a stepwise manner.

First, a common nanoelectrospray ionization source (manufactured by Analytica of Branford, Inc.) was obtained, the major components of which correspond with those illustrated in FIG. 1 (discussed above). The nanoelectrospray ionization source included a 20 cm narrow bore (500 μm) glass capillary to transfer ions created at atmospheric pressure into the first vacuum region of the mass spectrometer.

The capillary used with the electrospray ionization source was modified by depositing a thin layer of platinum or gold on each end of the capillary, which provided a method of applying voltages to focus ions as they traveled into and out of the capillary. One noticeable problem with such a capillary is the durability of the metal coating on the capillary. An electrical arc may be formed if too high of a voltage is used. Because the metal coating is not strong enough to sustain the current of such an electrical arc, a portion of the coating may flake off of the capillary when subjected to such an electrical arc. Once enough coating is removed, the desired lensing effect of the coating is compromised, necessitating replacing the coating or the entire capillary.

The known ionization device was modified by replacing the metal-coated transfer capillary with an all glass capillary having a similar length and bore size and whose inlet had been flared out to form a funnel like shape (illustrated in FIG. 2A). The flared bore capillary had a length of 20 cm, an outer diameter of 0.5 cm, a capillary bore diameter of 500 μm, and an inlet opening with a maximum diameter of 0.3 cm. Additionally, two thin stainless steel caps (illustrated in FIG. 2B) were fabricated to fit over each end of the capillary. The metal caps had an outer diameter of 0.64 cm, a length of 3 cm, and a hole with a diameter of 500 μm. The caps allowed a voltage to be applied to each end of the capillary (as with the original coated capillary), but were robust enough to withstand an electrical arc without breaking down physically. Each of the standard metal caps had a centrally positioned hole that was the same size as the bore in the capillary and that was aligned with the bore in the capillary. The performance of the device using nanoelectrospray ionization with exact positioning was then tested. The results obtained with the replacement capillary were indistinguishable from that obtained with the original transfer capillary. The sensitivity, as well as the resolution and charge states observed, were all essentially identical (data not shown). This result was expected as the replacement capillary and end caps mimicked the original coated capillary, only providing greater durability in a less expensive unit.

Figure 4A:
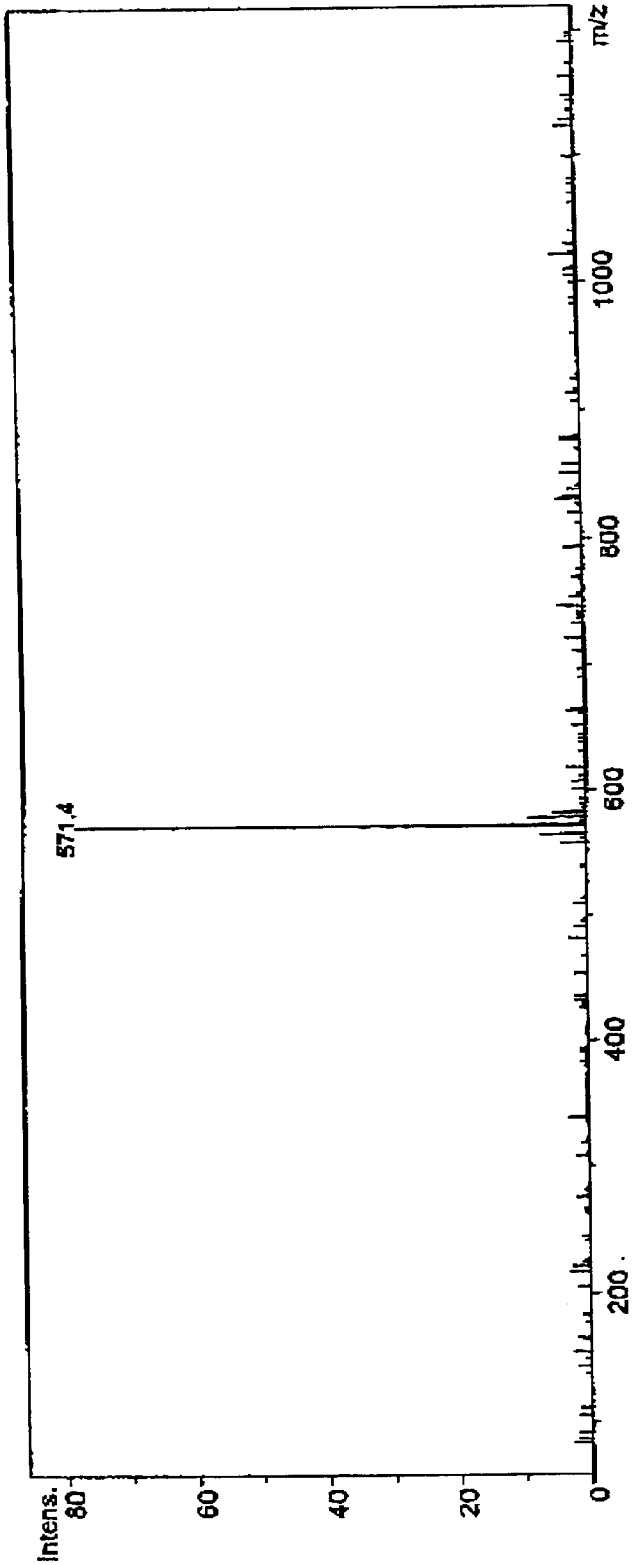
FIG. 4A shows the mass spectrum obtained from nanoelectrospray ionization mass spectrometry of a 35 μM solution of Gramicidin S using the capillary of FIG. 2A and the metal end cap of FIG. 2B (see Example 1 below).
Figure 4B:
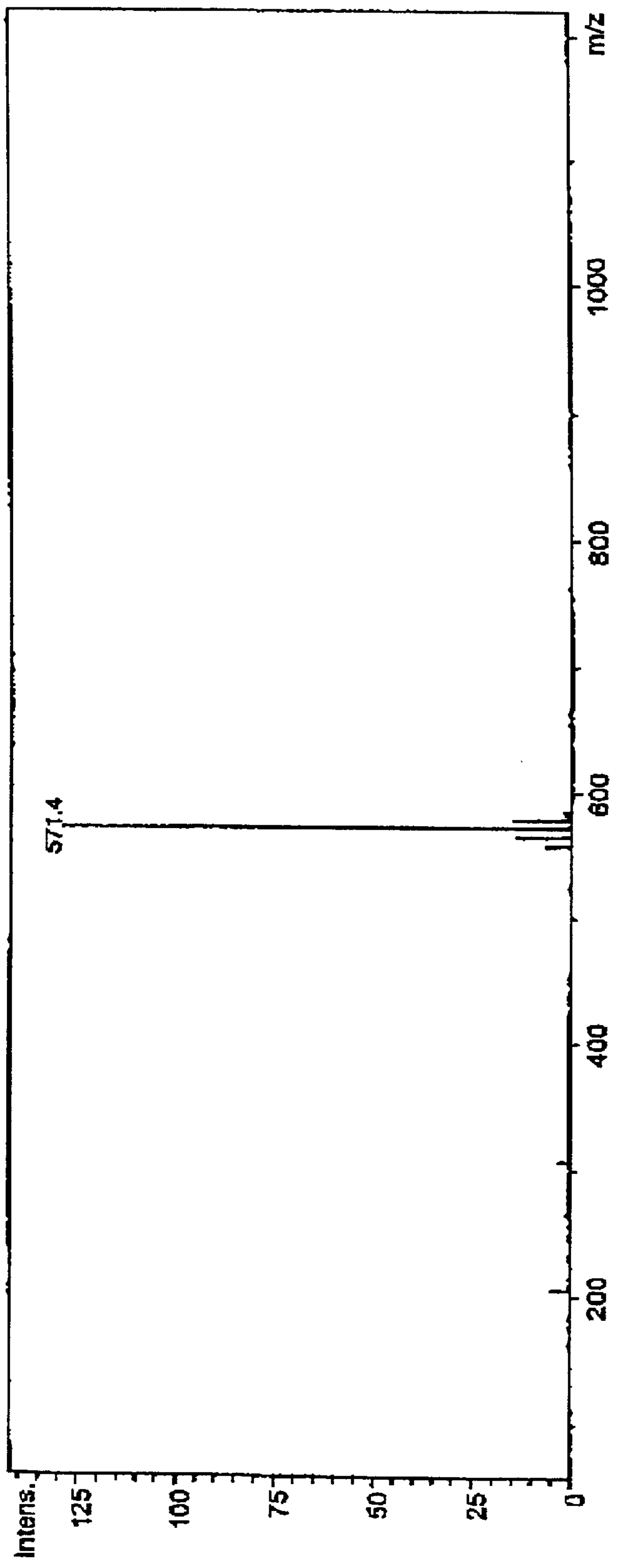
FIG. 4B shows the mass spectrum obtained from nanoelectrospray ionization mass spectrometry of a 35 μM solution of Gramicidin S using the capillary of FIG. 2A and the mesh end cap of FIG. 2C (see Example 1 below).

After verifying that the performance of the modified glass capillary with metal end caps was not different than the original standard device, experiments were performed to compare the modified device (with a single-hole metal end cap over the flared bore capillary inlet) to a nanoelectrospray ionization device according to the present invention having a 90% transmission metal mesh cap (illustrated in FIG. 2C) over the flared bore capillary inlet and a single-hole metal cap over the outlet of the capillary. The mesh cap had a length of 3 cm and an outer diameter of 0.64 cm. The mass spectrum obtained from a 35 μM solution of Gramicidin S using the single hole metal cap over the flared capillary inlet is shown in FIG. 4A. The mass spectrum obtained from a 35 μM solution of Gramicidin S using the metal mesh cap over the flared capillary inlet is shown in FIG. 4B. In both cases, the doubly charged peak of the peptide dominated the mass spectrum, and the data produced with the two caps were essentially identical. Additionally, similar signal intensities and signal to-noise (S/N) levels were observed. Therefore, the performance (specifically the sensitivity) of the nanoelectrospray ionization device according to the present invention (having a mesh cap over the flared bore capillary inlet) was not degraded as compared to the modified device (using a single-hole metal cap over the flared bore capillary). Because the modified device showed the same performance as the original Analytica device, it can be concluded that there was no performance degradation between the original Analytica device and the nanoelectrospray ionization device according to the present invention. Additionally, the flow rate was unaffected by the type of cap used on the transfer capillary.

Although exhaustive efforts were not undertaken to test the durability of the new caps and capillary, the nanoelectrospray ionization device maintained a consistent level of performance for more than twice as long as the original device. Regular cleaning was necessary depending on usage, as was the case with the original device. Additionally, no arcing damage was observed on the solid metal cap or the mesh cap when used over the inlet of the capillary.

Slightly more chemical build-up was noted on the mesh cap versus the solid metal cap. The build-up was able to be rinsed off with some methanol in most cases. In those cases where the build-up was more permanent on the solid metal cap, it was possible to lightly sand off any heavy residue with fine sand paper without appreciably affecting the cap thickness. Similar abrasive cleaning was not easy to implement with the mesh cap, so the mesh cap required occasional replacement when the chemical build-up was more permanent. The frequency of replacement depended on usage and sample type and varied from between once every two months to once every year. The old mesh was easily removed from the cap and a new piece of mesh was spot-welded onto the cap in approximately 10 minutes.

III. Example 2

Positional Tolerance Experiments of Needle Alignment with Capillary

The following experiments were conducted to determine the positional tolerance of the sprayer needle in both the x and y directions and the z direction as shown in FIG. 1 when using the standard metal cap with the flared bore capillary and when using the mesh cap with the flared bore capillary (both described above in Example 1).

A. Radial Direction

Figure 5:
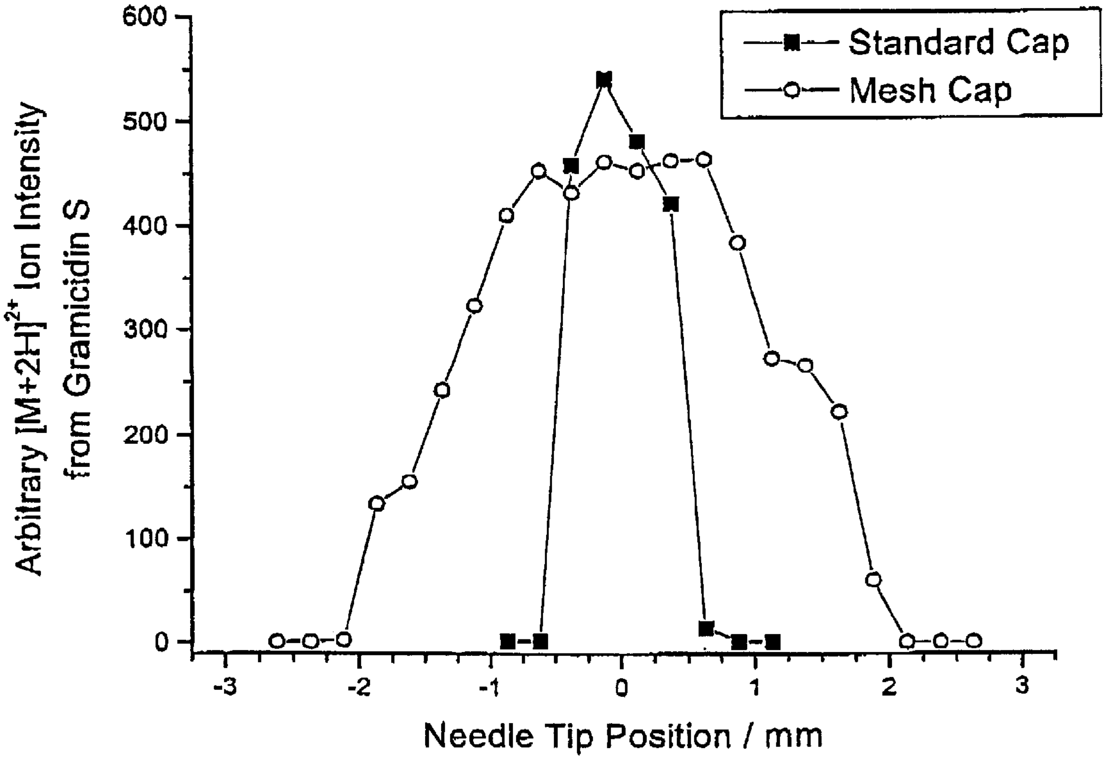
FIG. 5 shows the radial positioning tolerance (as needle tip position v. ion intensity) of using the mesh end cap of FIG. 2C versus the metal end cap of FIG. 2B (see Example 2 below).

In order to determine the tolerance of the needle in the x and y directions, mass spectra were acquired and the total analyte ion intensity was tabulated as the tip position was moved across the capillary entrance. Because the front of the capillary was cylindrical in shape, movement of the sprayer tip in the x or y direction was effectively movement in the radial direction ($r^2=x^2+y^2$). The results of the radial position tests with both capillary inlet caps are shown in FIG. 5.

The mesh cap allowed a total tip movement of approximately 3 mm with minimal reduction in signal, whereas the standard metal cap with a single-hole only allowed movement of less than 1 mm. The consequence of the tolerance difference is that when utilizing the mesh cap the needle tip only needs to be coarsely positioned in front of the capillary. Coarse positioning can be easily accomplished with the naked eye and does not require a complicated camera and microscope system. In comparison, when using the standard single-hole cap, the needle tip needs to be much more accurately positioned and may need to be optimized once data acquisition is started, requiring more time and effort and consuming additional sample.

B. Z Direction

The distance the needle tip is away from the capillary inlet (i.e., in the z direction) was also important in obtaining ion signal. As discussed above in the procedure used to initiate electrospray, this distance determines the voltage gradient present, which creates and sustains the electrospray flow. Therefore, the voltage applied to the entrance of the transfer capillary will have an effect on the optimum z-position of a needle.

Experiments to determine the range over which the z-position could be varied at a constant spray voltage were performed with both capillary entrance caps. With the mesh cap, signal was maintained over a range of 1 mm, whereas with the single-hole cap signal was maintained over a range of 0.75 mm. If the z-position was increased by more than 1 mm, the spray voltage had to be increased (i.e., made more negative) by approximately 500 V. The total allowable range of movement obtainable by continually increasing the spray voltage was 3 mm with the mesh cap and 5 mm with the single-hole metal cap. Practically, the difference in required z-position optimization between the mesh and single-hole caps was insignificant because some z-position or spray voltage optimization may be required regardless of the inlet cap used.

IV. Example 3

Experiment Demonstrating Low Flow Rate and Low Sample Amount

The following experiment was used to make an estimate of the minimum amount of sample detectable using the nanoelectrospray ionization device having a mesh cap and flared bore capillary.

Figure 6:
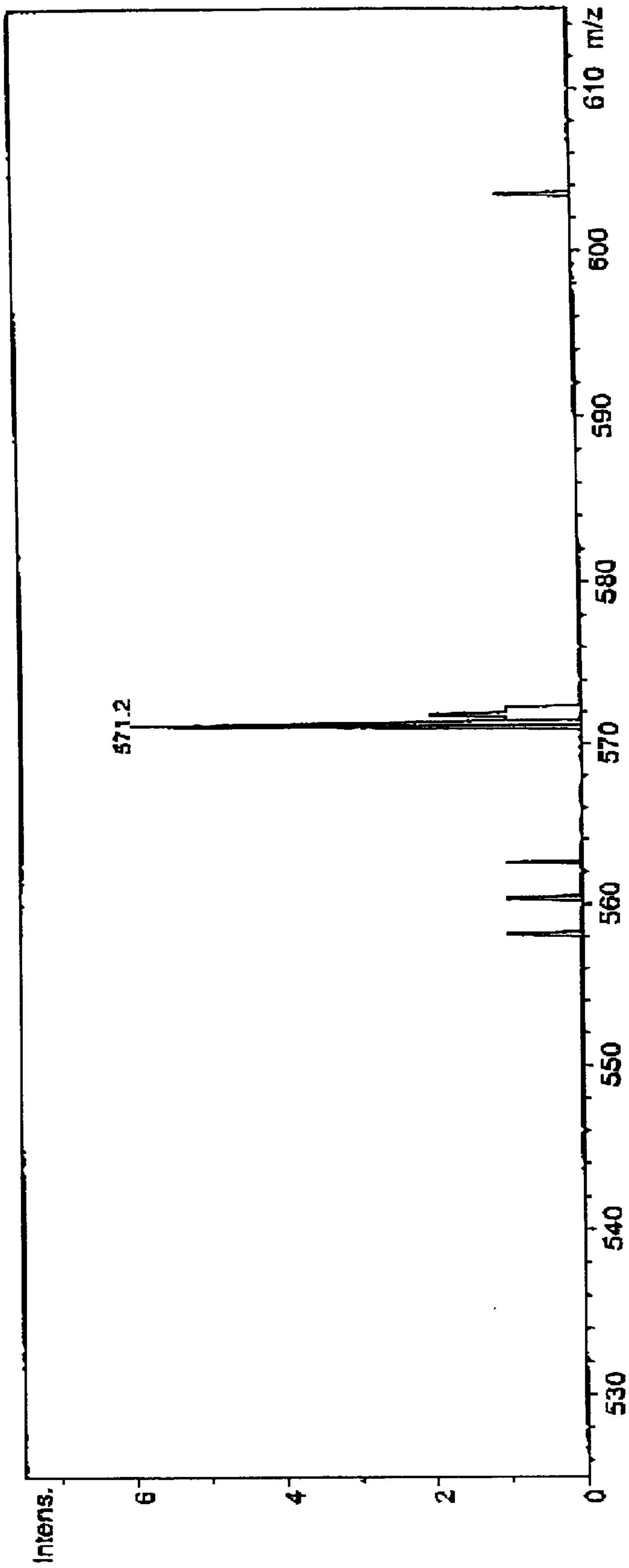
FIG. 6 shows the mass spectrum from a total of 2 attomoles of Gramicidin S obtained from ions created using a nanoelectrospray ionization device according to the present invention (see Example 3 below).

First, several nanoelectrospray ionization sprayer needles were tested until a suitable slow-flowing needle was found. Then, the accumulation time of the instrument was lowered so that the signal-to-noise level was reduced to below 10 and the total sample consumed to produce the spectra could be calculated. Data from 3 μL of a 2 μM solution of Gramicidin S is shown in FIG. 6. The measured flow rate for this sample was 2 μL/hr. The data was obtained using the average of 5 individual spectra, each utilizing an accumulation time of 0.4 msec and providing a signal-to-noise level of 6 for the doubly charged Gramicidin S ion. Therefore, 2 attomoles of sample solution were consumed in producing the spectrum in FIG. 6.

V. Example 4

Dual Sprayer Nanoelectrospray Ionization

Figure 7A:
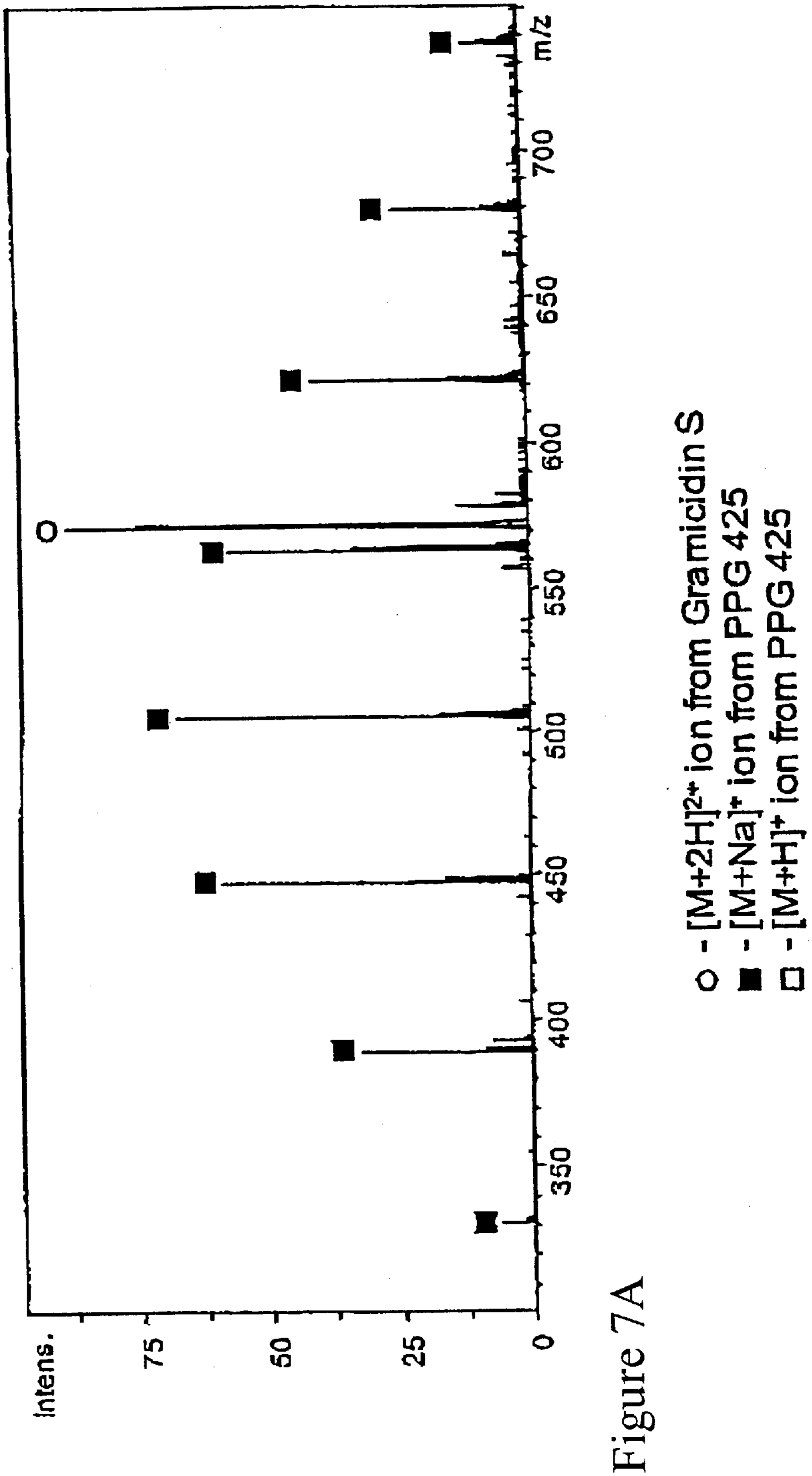
FIG. 7A shows the mass spectrum obtained from a dual nanoelectrospray ionization device according to the present invention with Gramicidin S (20 μM) in one spray needle and polypropylene glycol 425 (50 μM with 50 μM $Na^+$) in another spray needle (see Example 4 below).

The purpose of this experiment was to demonstrate that the large effective sampling orifice created by the mesh cap and flared bore transfer capillary allows dual sprayer nanoelectrospray ionization to be successfully performed. Solutions of Gramicidin S (20 μM) and polypropylene glycol 425 (50 μM with 50 μM $Na^+$) were loaded in separate nanoelectrospray ionization needles that were positioned in front of the mesh capillary cap. The signal obtained from simultaneous nanoelectrospray ionization from both needles is shown in FIG. 7A. The expected distribution of sodiated polymer signal was observed along with the doubly charged Gramicidin S signal. This example illustrates the possibility for internal mass scale calibration in nanoelectrospray ionization mass spectrometry. The known mass of PPG could be used to calibrate the mass range and gain an accurate mass measurement of Gramicidin S.

The specific alignment of the sprayer needles was determined to be important in obtaining the dual nanoelectrospray ionization signal. If the spray tips were spaced less than 2 mm from one another, then signal from one analyte completely dominated the mass spectrum. Presumably, this was due to overlap of the electrospray plumes. Once the needles were adjusted such that they would not interfere (which is only possible with the large acceptance area provided with the mesh cap), signal from both analytes was observed. Additionally, the fact that only sodiated polymer signal and protonated peptide signal was observed illustrates that there was very little chemical mixing in the gas phase before ionization.

Figure 7B:
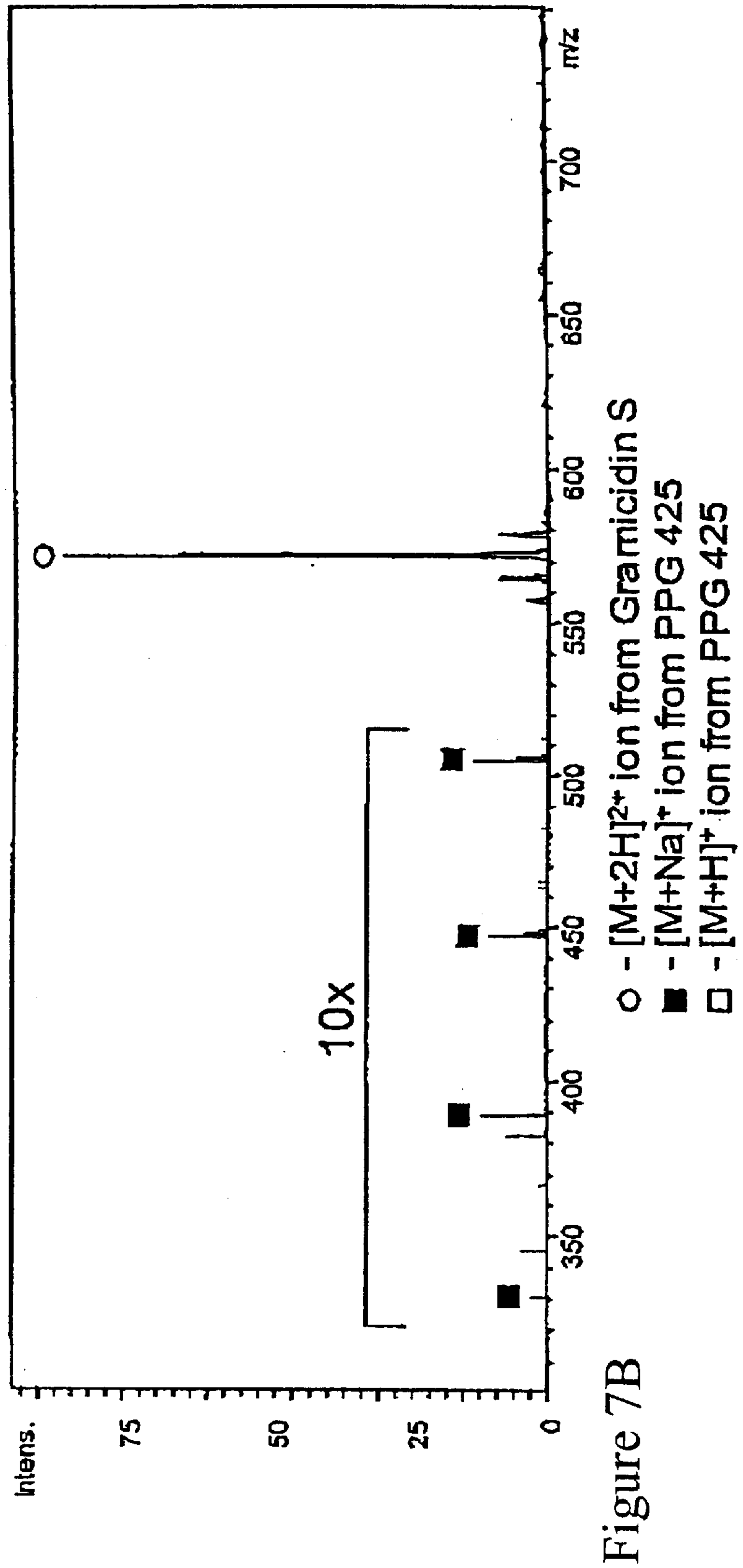
FIG. 7B shows the mass spectrum obtained from a single needle spraying a mixture of Gramicidin S (20 μM) and polypropylene glycol 425 (50 μM with 50 μM $Na^+$) under the same instrument operating conditions used to obtain the mass spectrum shown in FIG. 7A (see Example 4 below).

In order to compare the signal obtained with the dual sprayer setup to a single needle containing two solutions, solutions of Gramicidin S (20 μM) and polypropylene glycol 425 (50 μM with 50 μM $Na^+$) were mixed in a 1:1 ratio (reducing the concentration of each analyte by a factor of 2). The mixed solution was then sprayed out of a single needle with the same instrument operating conditions used for the dual sprayer experiment to obtain the mass spectrum illustrated in FIG. 7B. As shown in FIG. 7B, the Gramicidin S almost completely suppressed the PPG signal, illustrating a common problem when electrospraying mixtures.

Figure 7C:
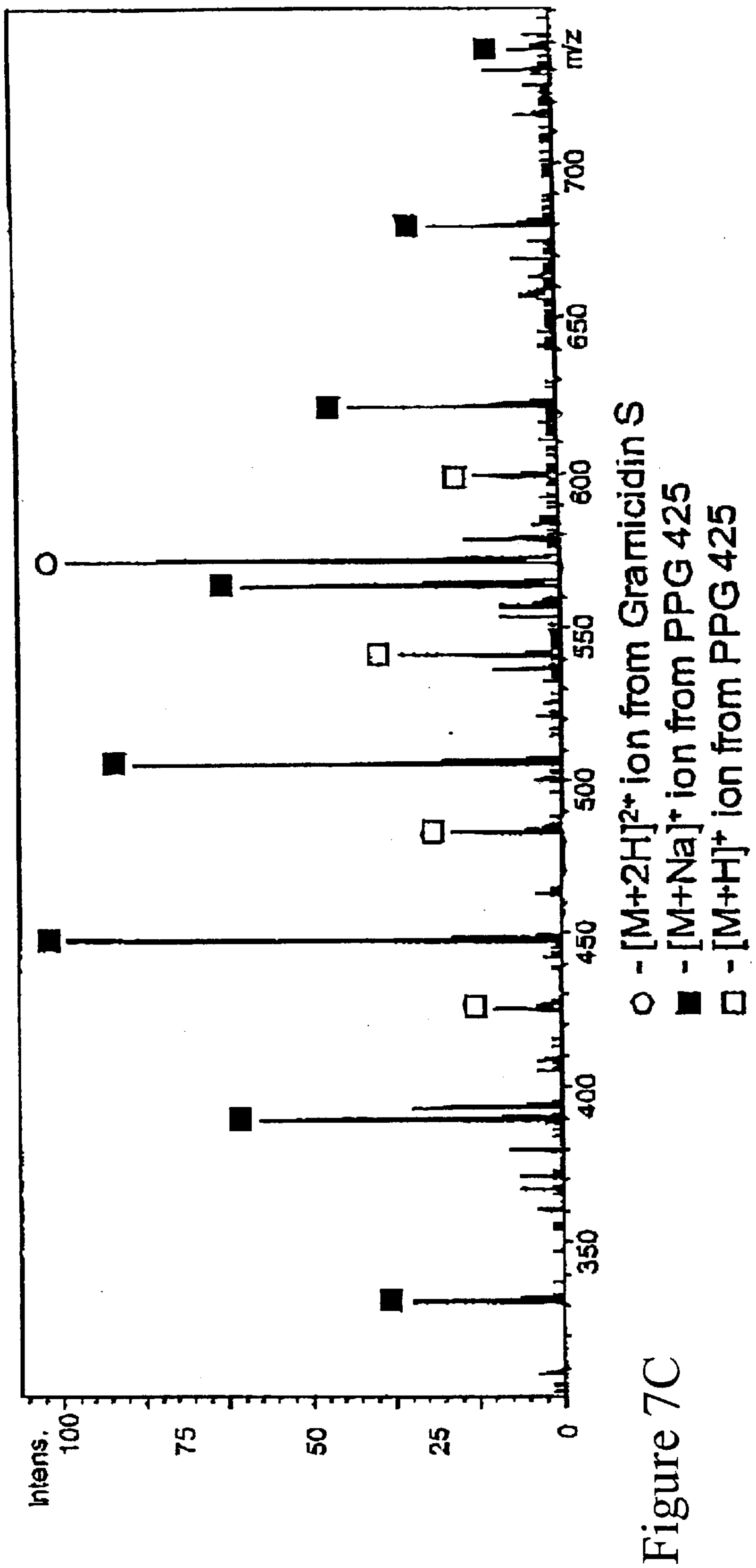
FIG. 7C shows the mass spectrum obtained from a single needle spraying a mixture of Gramicidin S (20 μM) and polypropylene glycol 425 (50 μM with 50 μM $Na^+$) after manipulation of the $N_2$ flow rate (see Example 4 below).

By adjusting the source voltages, or alternately carefully adjusting the $N_2$ countercurrent drying gas flow rate, it was possible to produce a spectrum similar to that obtained with the dual sprayer using a single sprayer needle containing a 1:1 mixture of a solution of Gramicidin S (20 μM) and a solution of polypropylene glycol 425 (50 μM with 50 μM $Na^+$). The mass spectrum that was obtained is shown in FIG. 7C. Producing the spectrum shown in FIG. 7C was experimentally much more difficult than producing the dual sprayer spectrum. Comparison of FIGS. 7A and 7C shows a second polymer distribution and an elevated noise level present in the single sprayer spectrum (i.e., FIG. 7C) compared to the dual sprayer spectrum (i.e., FIG. 7A). The second set of peaks in FIG. 7C was due to polymer ions that were protonated and not sodiated. As was noted earlier, adverse effects can occur when mixing the solvent systems of two samples. Adding the acidic methanol:water:acetic acid solution to the sodium-containing polymer solution provided protons as an alternate charge carrier for the polymer ions. Therefore, the spectrum became more complex as compared to the spectrum obtained using the dual sprayer (i.e., FIG. 7A), as the polymer calibrant signal was been split between multiple peaks. This example demonstrates the pitfalls of analyzing mixed sample solutions using one sprayer needle and the value of performing dual sprayer electrospray.

VI. Conclusions

The nanoelectrospray ionization device according to the present invention described in the Examples above allowed nanoelectrospray ionization mass spectrometry to be performed very quickly and easily with essentially no positional optimization being necessary. In addition, the nanoelectrospray ionization device had increased durability (compared to the metalized capillary of the original ion source) and enabled simultaneous multiple sprayer nanoelectrospray ionization. Consumption of two attomoles of analyte was shown to produce a spectrum with an adequate S/N level, demonstrating that the present invention does not result in any reduction in signal intensity or overall mass spectral quality compared to known devices. The nanoelectrospray ionization device described in the Examples was constructed by modifying an existing Analytica electrospray ionization source, a common source used with many mass spectrometers. However, any electrospray ionization source based upon a transfer capillary design could be modified in a similar way to provide an electrospray ionization device according to the present invention.

While the invention has been described in detail and with reference to specific embodiments thereof, it will be apparent to one skilled in the art that various changes and modifications can be made without departing from the spirit and scope of the invention.

What is claimed is:

1. An electrospray ionization device comprising:

one or more electrospray needles, each of the one or more needles having a distal end for receiving a sample, a tip for spraying the sample in fluid communication with the distal end, and an electrical contact for contacting at least some portion of sample therein;

a capillary located in proximity to the tip or tips of the one or more electrospray needles, the capillary having an inlet, an outlet, and an interior conduit in fluid communication with the inlet and the outlet, at least a portion of the inlet having a larger inner diameter than any inner diameter of the interior conduit, the inlet being shaped to aerodynamically focus ions generated from the one or more electrospray needles into the interior conduit of the capillary, the inlet having a counter-electrical contact; and means for generating an electrical potential difference between the counter-electrical contact of the capillary inlet and the electrical contact(s) of the one or more electrospray needles;

wherein the capillary and the one or more electrospray needles are arranged such that, under electrospray conditions, at least a portion of ions generated from each of the one or more electrospray needles will enter the inlet of the capillary.

2. The electrospray ionization device of claim 1, wherein the counter-electrical contact comprises a metal mesh covering the inlet of the capillary.

3. The electrospray ionization device of claim 1, wherein the counter-electrical contact of the inlet comprises a metal coating on the inlet.

4. The electrospray ionization device of claim 1, wherein the capillary is formed from an electrically-conductive material and wherein the counter-electrical contact comprises the electrically-conductive material forming the capillary.

5. The electrospray ionization device of claim 1, wherein the inlet of the capillary is formed from an electrically-conductive material and wherein the counter-electrical contact comprises the electrically-conductive material forming the inlet of the capillary.

6. The electrospray ionization device of claim 1, wherein the one or more electrospray needles are nanoelectrospray needles.

7. The electrospray ionization device of claim 1, wherein the one or more electrospray needles are standard electrospray needles.

8. The electrospray ionization device of claim 1, wherein the inlet of the capillary is funnel-shaped or cone-shaped.

9. An electrospray ionization device comprising:

one or more electrospray needles, each of the one or more needles having a distal end for receiving a sample, a tip for spraying the sample in fluid communication with the distal end, and an electrical contact for contacting at least some portion of sample therein;

a capillary located in proximity to the tip or tips of the one or more electrospray needles, the capillary having an inlet, an outlet, and an interior conduit in fluid communication with the inlet and the outlet, at least a portion of the inlet having a larger inner diameter than any inner diameter of the interior conduit, the inlet having a counter-electrical contact; and means for generating an electrical potential difference between the counter-electrical contact of the capillary inlet and the electrical contact(s) of the one or more electrospray needles.

10. The electrospray ionization device of claim 9, wherein the capillary and the one or more electrospray needles are arranged such that, under electrospray conditions, at least a portion of ions generated from each of the one or more electrospray needles will enter the inlet of the capillary.

11. The electrospray ionization device of claim 9, wherein the counter-electrical contact of the inlet comprises a metal coating on the inlet.

12. The electrospray ionization device of claim 9, wherein the counter-electrical contact of the inlet comprises a metal mesh covering the inlet.

13. The electrospray ionization device of claim 9, wherein the capillary is formed from an electrically-conductive material and wherein the counter-electrical contact comprises the electrically-conductive material forming the capillary.

14. The electrospray ionization device of claim 9, wherein the inlet of the capillary is formed from an electrically-conductive material and wherein the counter-electrical contact comprises the electrically-conductive material forming the inlet of the capillary.

15. The electrospray ionization device of claim 9, wherein the inlet of the capillary is shaped to aerodynamically focus ions generated from the one or more electrospray needles into the interior conduit of the capillary.

16. The electrospray ionization device of claim 9, wherein the inlet of the capillary is funnel-shaped or cone-shaped.

17. An electrospray ionization device comprising:

one or more electrospray needles, each of the one or more needles having a distal end for receiving a sample, a tip for spraying the sample in fluid communication with the distal end, and an electrical contact for contacting at least some portion of sample therein;

a capillary located in proximity to the tip or tips of the one or more electrospray needles, the capillary having an inlet, an outlet, and an interior conduit in fluid communication with the inlet and the outlet, the inlet having a counter-electrical contact comprising a metal mesh covering the inlet; and means for generating an electrical potential difference between the counter-electrical contact of the capillary inlet and the electrical contact(s) of the one or more electrospray needles.

18. The electrospray ionization device of claim 17, wherein the inlet of the capillary is shaped to aerodynamically focus ions generated from the one or more electrospray needles into the interior conduit of the capillary.

19. The electrospray ionization device of claim 17, wherein the inlet of the capillary is funnel-shaped or cone-shaped.

20. A nanoelectrospray ionization device comprising:

one or more nanoelectrospray needles, each of the one or more needles having a distal end for receiving a sample, a tip for spraying the sample in fluid communication with the distal end, and an electrical contact for contacting at least some portion of sample therein;

a capillary located in proximity to the tip or tips of the one or more nanoelectrospray needles, the capillary having an inlet, an outlet, and an interior conduit in fluid communication with the inlet and the outlet, at least a portion of the inlet having a larger inner diameter than any inner diameter of the interior conduit, the inlet being shaped to aerodynamically focus ions generated from the one or more nanoelectrospray needles into the interior conduit of the capillary, the inlet having a counter-electrical contact comprising a metal mesh covering the inlet of the capillary; and means for generating an electrical potential difference between the counter-electrical contact of the capillary inlet and the electrical contact(s) of the one or more nanoelectrospray needles.

21. The nanoelectrospray ionization device of claim 20, wherein the inlet of the capillary is funnel-shaped or cone-shaped.

22. The nanoelectrospray ionization device of claim 20, wherein there are at least two nanoelectrospray needles.

23. The nanoelectrospray ionization device of claim 20, wherein the capillary and the one or more nanoelectrospray needles are arranged such that, under electrospray conditions, at least a portion of ions generated from each of the one or more nanoelectrospray needles will enter the inlet of the capillary.

24. The nanoelectrospray ionization device of claim 22, wherein the inlet of the capillary is funnel-shaped or cone-shaped and wherein the capillary and the at least two nanoelectrospray needles are arranged such that, under electrospray conditions, at least a portion of ions generated from each of the one or more nanoelectrospray needles will enter the inlet of the capillary.

25. An electrospray ionization device comprising:

one or more electrospray needles, each of the one or more needles having a distal end for receiving a sample, a tip for spraying the sample in fluid communication with the distal end, and an electrical contact for contacting at least some portion of sample therein;

an ion sampling device located in proximity to the tip or tips of the one or more electrospray needles, the ion sampling device having an entrance, an exit, and an interior in fluid communication with the entrance and the exit, the entrance defining an opening having a larger area than an opening defined by the exit, the ion sampling device having a counter-electrical contact, the ion sampling device being shaped to aerodynamically focus ions generated from the one or more electrospray needles through the exit of the ion sampling device; and means for generating an electrical potential difference between the counter-electrical contact and the electrical contact(s) of the one or more electrospray needles.

26. The electrospray ionization device of claim 25, wherein the ion sampling device and the one or more electrospray needles are arranged such that, under electrospray conditions, at least a portion of ions generated from each of the one or more electrospray needles will enter the entrance of the ion sampling device.

27. The electrospray ionization device of claim 25, wherein the counter-electrical contact comprises a metal coating on the ion sampling device.

28. The electrospray ionization device of claim 25, wherein the counter-electrical contact comprises a metal mesh covering the entrance of the ion sampling device.

29. The electrospray ionization device of claim 25, wherein the ion sampling device is formed from an electrically-conductive material and wherein the counter-electrical contact comprises the electrically-conductive material forming the ion sampling device.

30. The electrospray ionization device of claim 25, wherein the ion sampling device is funnel-shaped or cone-shaped.

31. The electrospray ionization device of claim 26, wherein the ion sampling device is funnel-shaped or cone-shaped to aerodynamically focus ions generated from the one or more electrospray needles through the exit of the ion sampling device.

32. The electrospray ionization device of claim 31, wherein the counter-electrical contact comprises a metal mesh covering the entrance of the ion sampling device.

33. An electrospray ionization device comprising:

one or more electrospray needles, each of the one or more needles having a distal end for receiving a sample, a tip for spraying the sample in fluid communication with the distal end, and an electrical contact for contacting at least some portion of sample therein;

means for sampling ions generated during electrospray ionization, the means shaped to aerodynamically focus ions generated from the one or more electrospray needles, the means including a counter-electrical contact; and means for generating an electrical potential difference between the counter-electrical contact and the electrical contact(s) of the one or more electrospray needles;

wherein the means for sampling ions and the one or more electrospray needles are arranged such that, under electrospray conditions, at least a portion of ions generated from each of the one or more electrospray needles will be sampled by the means for sampling ions.

* * * * *